(12) United States Patent
Takeda et al.

(10) Patent No.: US 8,330,771 B2
(45) Date of Patent: Dec. 11, 2012

(54) PROJECTION DISPLAY DEVICE AND CONTROL METHOD THEREOF

(75) Inventors: Kazuyuki Takeda, Ora-gun (JP); Osamu Sato, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 818 days.

(21) Appl. No.: 12/419,920

(22) Filed: Apr. 7, 2009

(65) Prior Publication Data
US 2010/0060805 A1    Mar. 11, 2010

(30) Foreign Application Priority Data

Sep. 10, 2008 (JP) .................................. 2008-232394
Dec. 26, 2008 (JP) .................................. 2008-334640

(51) Int. Cl.
| | |
|---|---|
| G09G 5/00 | (2006.01) |
| G09G 5/02 | (2006.01) |
| G09G 3/30 | (2006.01) |
| G09G 5/10 | (2006.01) |
| H04N 5/46 | (2006.01) |
| H04N 9/64 | (2006.01) |
| H04N 1/46 | (2006.01) |
| G02F 1/1335 | (2006.01) |
| G02F 1/13 | (2006.01) |
| G03F 3/08 | (2006.01) |
| G06K 9/00 | (2006.01) |
| G06K 9/40 | (2006.01) |
| H04N 3/223 | (2006.01) |
| H04N 1/40 | (2006.01) |

(52) U.S. Cl. ........ 345/600; 345/589; 345/606; 345/690; 345/77; 345/581; 348/557; 348/672; 348/571; 348/704; 349/5; 349/193; 358/518; 358/522; 358/525; 358/448; 382/167; 382/168; 382/254; 382/274; 382/162

(58) Field of Classification Search .................. 345/581, 345/589–591, 600–601, 606, 156, 204, 83–88, 345/903, 690, 697, 22, 63, 77; 348/253–254, 348/674–675, 739, 751, 552, 557, 671–672, 348/571, 687, 708, 704; 358/1.9, 518, 519–522
See application file for complete search history.

(56) References Cited

U.S. PATENT DOCUMENTS

| | | | | |
|---|---|---|---|---|
| 5,594,850 | A * | 1/1997 | Noyama et al. | 345/632 |
| 6,449,005 | B1 * | 9/2002 | Faris | 348/60 |
| 7,570,809 | B1 * | 8/2009 | Srinivasa | 382/167 |
| 2001/0052971 | A1 * | 12/2001 | Tsuchiya et al. | 355/77 |

(Continued)

FOREIGN PATENT DOCUMENTS

JP    2003-069825    3/2003

(Continued)

OTHER PUBLICATIONS

Japanese Patent Application No. 2008-334640, Notice of Reasons for Rejection, mailed Jun. 2, 2009, (English translation).

(Continued)

Primary Examiner — Wesner Sajous
(74) Attorney, Agent, or Firm — Blakely, Sokoloff, Taylor & Zafman LLP (57) ABSTRACT

According to one embodiment, a discrimination module that discriminates whether an input image signal is of CG images or natural images, a color correction module that applies color correction processing for CG images to the input image signal when the input image signal is determined to be of CG images or applies color correction processing for natural images to the input image signal when the input image signal is determined to be of natural images, and a projection module that generates an optical image based on the image signal applied with the color correction processing, and projects and displays the image on a screen through a projection lens, are included.

5 Claims, 7 Drawing Sheets

U.S. PATENT DOCUMENTS

| | | | |
|---|---|---|---|
| 2003/0160864 A1* | 8/2003 | Kremen | 348/51 |
| 2004/0184673 A1* | 9/2004 | Watanabe | 382/274 |
| 2005/0088625 A1 | 4/2005 | Imade | |
| 2005/0185249 A1* | 8/2005 | Uchiyama et al. | 359/291 |
| 2005/0280745 A1 | 12/2005 | Takeda et al. | |
| 2006/0050087 A1* | 3/2006 | Tanimura et al. | 345/629 |
| 2007/0019166 A1* | 1/2007 | Iwasaki | 353/34 |
| 2007/0031029 A1* | 2/2007 | Sasaki | 382/154 |
| 2007/0121140 A1* | 5/2007 | Yamazoe et al. | 358/1.9 |
| 2007/0279658 A1* | 12/2007 | Ito et al. | 358/1.9 |

FOREIGN PATENT DOCUMENTS

| | | |
|---|---|---|
| JP | 2003-123072 | 4/2003 |
| JP | 2004-080161 | 3/2004 |
| JP | 3801573 | 10/2004 |
| JP | 2004-325645 | 11/2004 |
| JP | 2005-134482 | 5/2005 |
| JP | 2006-003615 | 1/2006 |
| JP | 2006-042014 | 2/2006 |
| JP | 2008-107653 | 5/2008 |
| JP | 2008-185620 | 8/2008 |

OTHER PUBLICATIONS

Japanese Patent Application No. 2008-334640, Notice of Reasons for Rejection, mailed Sep. 29, 2009, (with English Translation).

* cited by examiner

PROJECTION DISPLAY DEVICE AND CONTROL METHOD THEREOF

CROSS-REFERENCE TO RELATED APPLICATIONS

This application is based upon and claims the benefit of priority from Japanese Patent Applications No. 2008-232394, filed Sep. 10, 2008; and No. 2008-334640, filed Dec. 26, 2008, the entire contents of both of which are incorporated herein by reference.

BACKGROUND

1. Field

One embodiment of the invention relates to a projection display device that is suitably used for a color projector, especially, of a digital light processing (DLP) system, and a control method thereof.

2. Description of the Related Art

As widely known, a color projector of a DLP system allows light emitted from a white light source to sequentially pass through color segments of red (R), green (G), and blue (B) provided in a rotating color wheel and to be irradiated on a panel surface of a digital micromirror device (DMD).

In the DMD, optical images corresponding to R, G, and B light are formed by reflection of a number of micromirrors in synchronization with light sequentially irradiated on the panel surface after passing through the color segments of R, G, and B. Then, the optical images corresponding to R, G, and B light formed by the DMD are enlarged by a projection lens and projected on a screen. In this manner, color video display is carried out on the screen.

Here, in the color projector of the DLP system as described above, at present, there starts to be employed one that uses a color wheel, in which a white (W) segment that is an uncolored and transparent light transmission module is added to the color segments of R, G, and B, in order to improve luminous of projected images.

By using the color wheel added with the W segment, R, G, B, and W light is sequentially irradiated on the panel surface of the DMD in a time division manner. Then, when W light is irradiated, luminous can be increased by the light reflected to the projection lens by all micromirrors of the DMD.

In the color projector of the DLP system added with the W segment as described above, when images (hereinafter referred to as CG images) created by using a computer graphics (CG) technique, such as one for presentation or animations, is projected, there is a problem that degradation of color purity and degradation of saturation of colors cannot be avoided.

This problem occurs due to that luminous of a section with a light color and high luminous is optically increased, and a color of a colored object is recognized in high contrast with a white background in a scene where the colored object exists with the white background. Accordingly, due to nature of eyes of a human being, the colored section is seemed darkened in contrast. That is, due to visual influence of a white color, vividness of colors is sensed to be lost in contrast.

For the above reason, under present circumstances, a method of applying color correction processing for increasing lightness and saturation of colors is employed with respect to generation of the phenomenon described above, so as to prevent darkening of colors. However, the color correction processing as described above results in projection of unnatural images with colors that are too deep when the processing is applied to images (hereinafter referred to as natural images) obtained by shooting an optical image of an object receiving light irradiation from a light source.

Jpn. Pat. Appln. Publication No. 2008-185620 discloses a configuration where a projector receives input of image information showing an image and type information showing a type of the image from an image supply device. Then, a color mode for performing adjustment of colors is set in accordance with the type information, and a projected image is adjusted by a projection module in accordance with the set color mode.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a discrimination module that discriminates whether an input image signal is of CG images or natural images, a color correction module that applies color correction processing for CG images to the input image signal when the input image signal is determined to be of CG images or applies color correction processing for natural images to the input image signal when the input image signal is determined to be of natural images, and a projection module that generates an optical image based on the image signal applied with the color correction processing, and projects and displays the image on a screen through a projection lens, are included.

Figure 1:
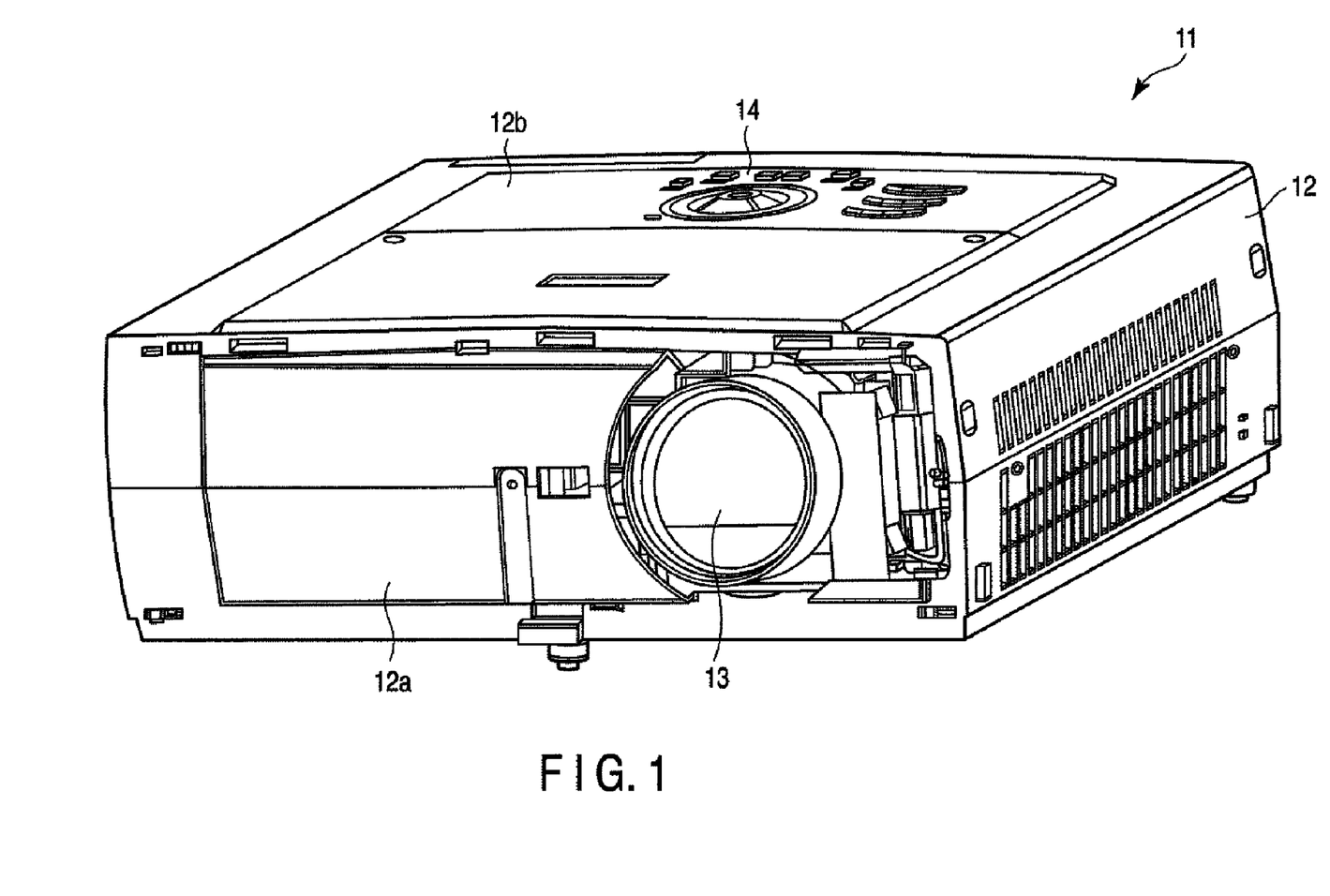
FIG. 1 is a perspective view showing an embodiment of the present invention for explaining an appearance of a color projector of a DLP system.

FIG. 1 shows an appearance of a color projector 11 in a DLP system described in this embodiment. The color projector 11 includes a cabinet 12 of a stationary type that is a projector main body and formed in a substantially thin box shape.

Then, a projection lens 13 is disposed on an end section of a front panel 12a of the cabinet 12. The projection lens 13 is used for enlarging and projecting visualized information to be displayed on a screen, which will be described later, that is an image projection surface installed in front of the cabinet 12.

In addition, an operation module 14 is disposed on a rear end side center section of a top panel 12b of the cabinet 12. The operation module 14 is used together with a remote controller, which will be described later, and can control the color projector 11 to be in a variety of operation states or a stop state based on operation by the user.

Figure 2:
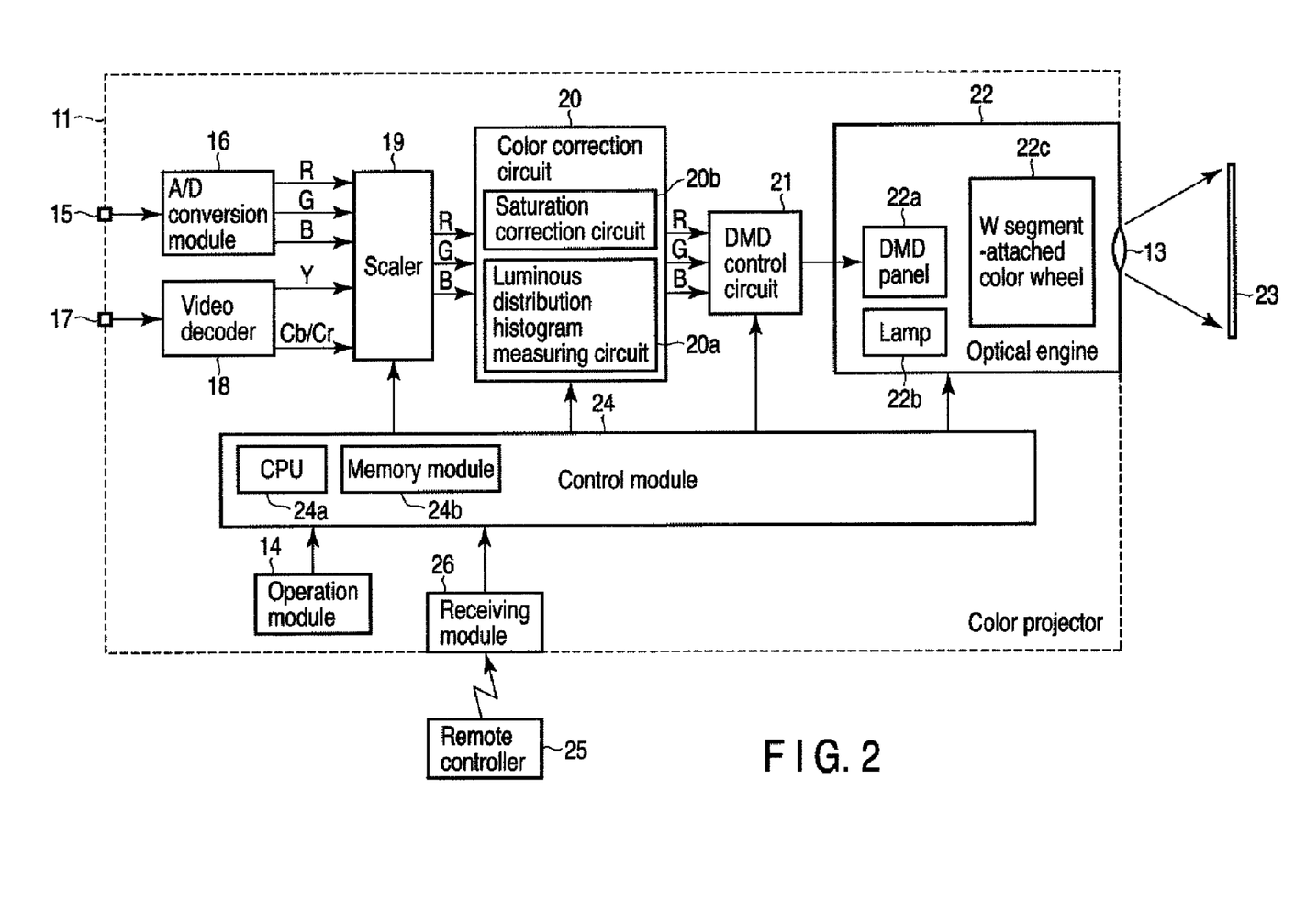
FIG. 2 is a block configuration diagram shown for explaining an outline of a signal processing system of the color projector in the embodiment.

FIG. 2 schematically shows a signal processing system of the color projector 11 described above. In FIG. 2, an input terminal 15 can receive input of an analog RGB signal from the outside of the color projector 11. An analog RGB signal input to the input terminal 15 is supplied to an analog-to-digital (A/D) conversion module 16 and converted to three types of digital image signals (a R signal, a G signal, and a B signal) corresponding to R, G, and B.

On the other hand, in FIG. 2, an input terminal 17 can receive input of an analog video signal from the outside of the color projector 11. An analog video signal input to the input terminal 17 is supplied to a video decoder 18 and converted to a digital luminous signal Y and digital color signals Cb/Cr.

Then, the digital R, G, and B signals output from the A/D conversion module 16 and the digital luminous signal Y and the digital color signals Cb/Cr output from the video decoder 18 are supplied to a scaler 19. The scaler 19 converts the digital luminous signal Y and the color signals Cb/Cr supplied from the video decoder 18 to three types of digital image signals (a R signal, a G signal, and a B signal) corresponding to R, G, and B.

Then, the scaler 19 selectively applies scaling processing to the digital R, G, and B signals supplied from the A/D conversion module 16 and the digital R, G, and B signals obtained by converting the digital luminous signal Y and the digital color signals Cb/Cr. The scaling processing is for converting input digital R, G, and B signals to be matching with resolution (number of pixels) of a DMD panel 22a used in a later stage, and for matching resolution of the input digital R, G, and B signals and the resolution of the DMD panel 22a. That is, the scaling processing adjusts the number of pixels of the input digital R, G, and B signals to be adapted to a plurality of micromirrors (a plurality of pixels) of the DMD panel 22a.

After that, the digital R, G, and B signals applied with the scaling processing in the scaler 19 are supplied to a color correction circuit 20. The color correction circuit 20 converts input digital R, G, and B signals to a digital luminous signal Y and digital color signals Cb/Cr, and supplies the digital luminous signal Y to a luminous distribution histogram measuring circuit 20a, and supplies the digital color signals Cb/Cr to a saturation correction circuit 20b.

Of these, the luminous distribution histogram measuring circuit 20a acquires histogram data (number of pixels) for each luminous level with respect to one frame of an input luminous signal Y. In this case, the numbers of pixels corresponding to a plurality of luminous levels (for example, 0-255) that correspond to resolution set in advance are acquired. For this reason, when all the numbers of pixels corresponding to the luminous levels are added, the total number is equal to the number of pixels included in one frame of the input luminous signal Y.

In addition, a control module 24, which will be described later, discriminates whether an input image signal is of CC images or of natural images based on a result of measurement of luminous histogram data performed by the luminous distribution histogram measuring circuit 20a. Then, the saturation correction circuit 20b switches a correction amount of when saturation correction processing is applied to the input color signals Cb/Cr, based on a result of the discrimination.

That is, the saturation correction circuit 20b operates to apply saturation correction processing, in which a correction amount is increased to increase saturation of colors, to the input color signals Cb/Cr when the input image signal is determined to be of CC images, so that colors that are projected and displayed can be seen vividly without darkening.

Also, the saturation correction circuit 20b operates to apply the saturation correction processing with a small correction amount, or rather operates to apply the saturation correction processing just a little, to the input color signals Cb/Cr when the input image signal is determined to be of natural images, so as to prevent colors that are projected and displayed from becoming unnatural with too deep colors.

Then, the digital luminous signal Y converted from the digital R, G, and B signals and the color signals Cb/Cr applied with the saturation correction processing in the color correction circuit 20 are converted to digital R, G, and B signals and supplied to a DMD control circuit 21. The DMD control circuit 21 generates a digital W (white) signal from the input digital R, G, and B signals. Then, the DMD control circuit 21 supplies the input digital R, G, and B signals and the generated digital W signal to a DMD panel 22a that constitutes an optical engine 22 in a time division manner.

Figure 3:
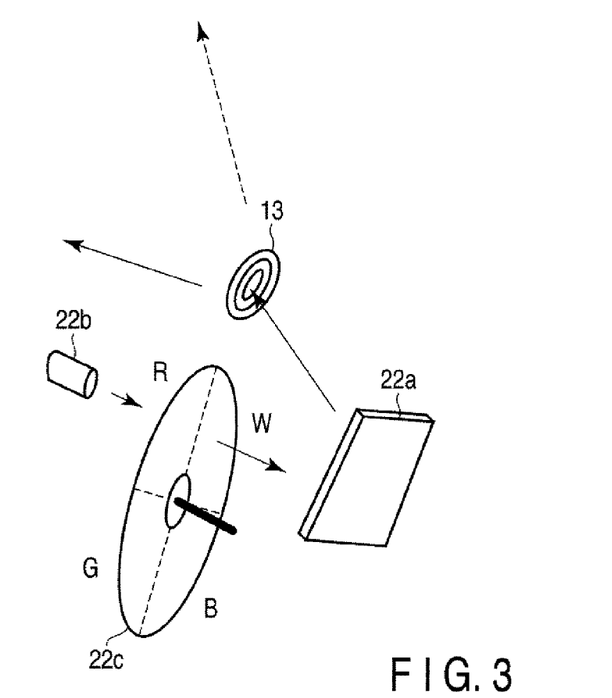
FIG. 3 is a diagram shown for explaining, in principle, an optical engine of the color projector in the embodiment.

The optical engine 22 includes the DMD panel 22a, a lamp 22b as a light source, a color wheel 22c including a W segment, the projection lens 13, and the like as main constituents, as shown in FIG. 3 in principle. Then, light irradiated from the lamp 22b passes through the color wheel 22c, and irradiated on a micromirror array surface of the DMD panel 22a. In this case, the color wheel 22c includes segments of R, G, B, and W arranged around a rotational axis thereof. The color wheel 22c is rotationally driven by a motor (not shown) so that the light irradiated from the lamp 22b sequentially passes through the segments and is irradiated on the DMD panel 22a.

Also, the DMD panel 22a reflects incident light as colored image light in a direction to the projection lens 13 in a manner that reflecting directions of micromirrors are switched in accordance with the input digital R, G, B, and W signals in a time division manner. Then, rotation of the color wheel 22c is coordinated so that colored light that passes through the R, G, B, and W segments is irradiated on the DMD panel 22a in a time division manner, in synchronization with the DMD panel 22a that is driven in accordance with the digital R, G, B, and W signals. In the above manner, the optical images corresponding to the R, G, B, and W color components formed by the DMD panel 22a are enlarged by the projection lens 13 and projected on the screen 23, and color image display is carried out on the screen.

Here, the overall image display operation of the color projector 11 described above is controlled by the control module 24. The control module 24 includes, for example, a central processing unit (CPU) 24a, and controls each module based on operation information obtained from the operation module 14 or operation information transmitted from the remote controller 25 and received by a receiving module 26, so as to reflect a content of the operation.

In this case, the control module 24 uses a memory module 24b. The memory module 24b mainly includes a read only memory (ROM) that stores a control program executed by the CPU 24a, a random access memory (RAM) that provides an operation area to the CPU 24a, and a non-volatile memory that stores a variety of setting information, control information, and the like.

Figure 4:
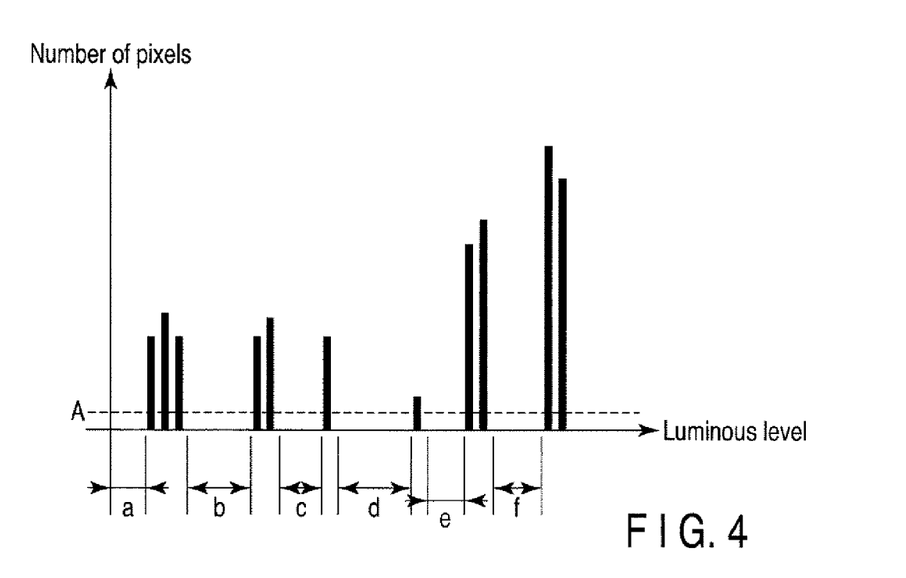
FIG. 4 is a diagram shown for explaining an example of luminous histogram data when an image signal input to the color projector in the same embodiment is of CG images.
Figure 5:
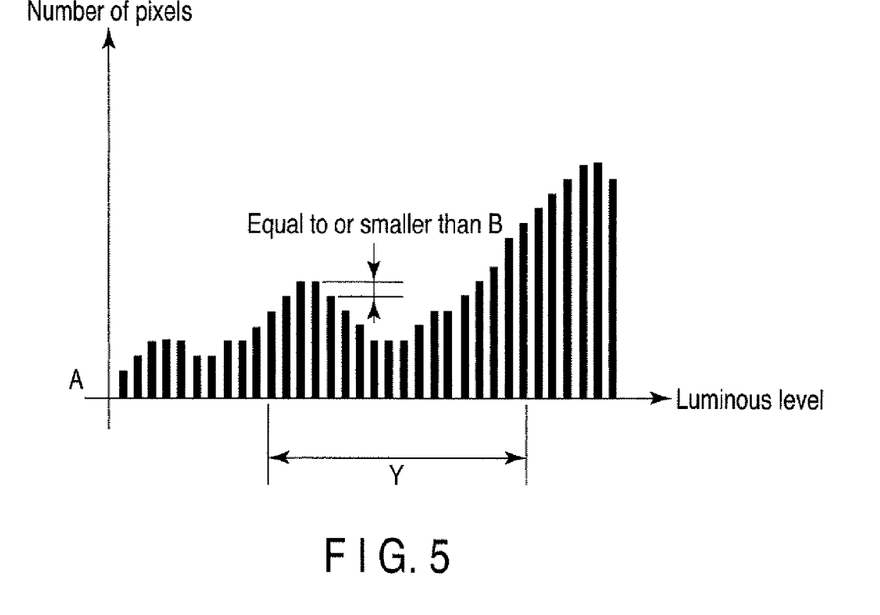
FIG. 5 is a diagram shown for explaining an example of luminous histogram data when an image signal input to the color projector in the same embodiment is of natural images.

Next, description will be made with respect to the luminous histogram data measured by the luminous distribution histogram measuring circuit 20a of the color correction circuit 20 and the saturation correction processing carried out by the saturation correction circuit 20b. First, the luminous histogram data shows histogram data (number of pixels) with respect to luminous levels obtained for one frame of a luminous signal Y, as shown in FIGS. 4 and 5. In this case, FIG. 4 shows an example of luminous histogram data when an input image signal is of CG images, and FIG. 5 shows an example of luminous histogram data when the input image signal is of natural images.

That is, for CG images, a colored section and an uncolored section are clearly divided, as compared with natural images obtained by shooting an optical image of an object receiving light irradiation from a light source. For this reason, luminous histogram data of CG images show what is called a discrete type characteristic, where pixels having a certain degree of a luminous level and pixels having a bright level that is almost equal to 0 are divided clearly, as shown in FIG. 4.

In contrast, for natural images obtained by shooting an optical image of an object receiving light irradiation from a light source, luminous levels gradually change between a side on which light is irradiated and on an opposite side thereof. For this reason, luminous histogram data of natural images shows what is called a continuous type characteristic, where pixels exist for all luminous levels and a difference in the numbers of pixels between adjacent luminous levels is extremely small.

Therefore, the control module 24 discriminates whether luminous histogram data shows the discrete type characteristic or the continuous type characteristic. The control module 24 determines that the input image signal is of CG images when the data shows the discrete type characteristic, or determines that the input image signal is of natural images when the data shows the continuous type characteristic.

In the discrimination, the control module 24 first discriminates whether or not the luminous histogram data shows the discrete type characteristic. In this case, as shown in FIG. 4, the control module 24 counts the number of luminous levels, at which the number of pixels is equal to or smaller than a first threshold value A set in advance (in FIG. 4, a+b+c+d+e+f). When the counted value is equal to or larger than a second threshold value X set in advance, the control module 24 determines that the luminous histogram data has the discrete type characteristic.

Then, when the control module 24 determines that the luminous histogram data has the discrete type characteristic, the saturation correction circuit 20b operates to apply the saturation correction processing, in which a correction amount is increased to increase saturation of colors, to input color signals Cb/Cr. In this case, for the input color signals Cb/Cr, the saturation correction circuit 20b increases levels according to a gain characteristic (first correction amount) set in advance, as shown by a solid line in FIG. 6.

Figure 6:
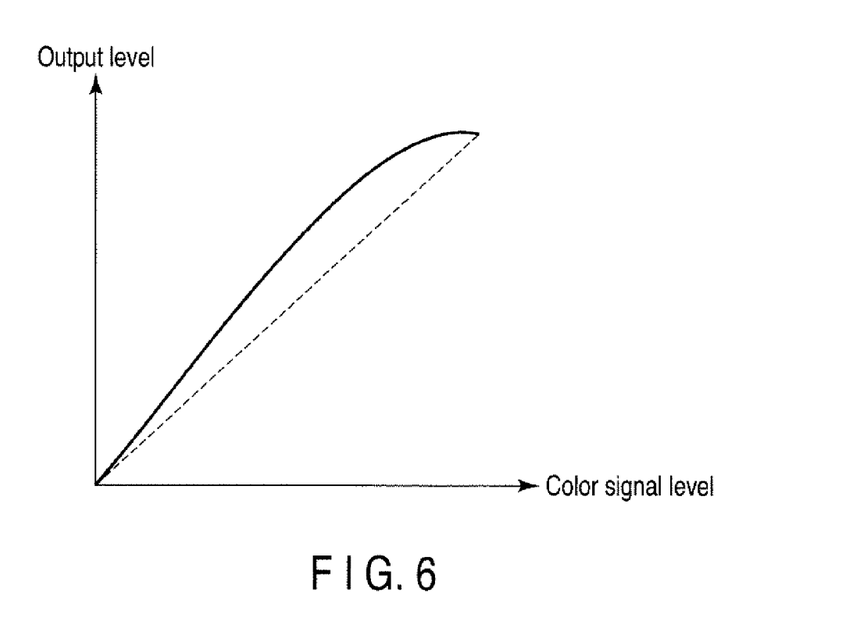
FIG. 6 is a diagram shown for explaining switching of correction amounts of color correction processing performed by the color projector in the embodiment between CG images and natural images.

The saturation correction processing with respect to color signals Cb/Cr as described above is carried out with respect to a total of six colors, including cyan, magenta, and yellow in addition to R, G, and B. Here, a gain characteristic with respect to each of the colors is set to be a characteristic that can prevent darkening of colored modules as a whole by increasing luminous and saturation of colors of CG images.

In addition, when the control module 24 determines that the luminous histogram data does not have the discrete type characteristic, the control module 24 discriminates whether or not the luminous histogram data shows the continuous type characteristic. In this case, as shown in FIG. 5, the control module 24 counts the number of luminous levels, at which a difference in the number of pixels with an adjacent luminous level is equal to or smaller than a third threshold value B set in advance. When the counted value is equal to or larger than a fourth threshold value Y set in advance, the control module 24 determines that the luminous histogram data has the continuous type characteristic.

Then, when the control module 24 determines that the luminous histogram data has the continuous type characteristic, the saturation correction circuit 20b applies the saturation correction processing with a second correction amount that is lower than the first correction amount, or applies the saturation correction processing just a little, to the input color signals Cb/Cr, so as to prevent projected and displayed colors from becoming too deep and unnatural. In this case, the saturation correction circuit 20b is set to have a gain characteristic (second correction amount), in which a ratio between an input level and an output level is almost one-to-one as shown by a dotted line in FIG. 6, with respect to the input color signals Cb/Cr.

Figure 7:
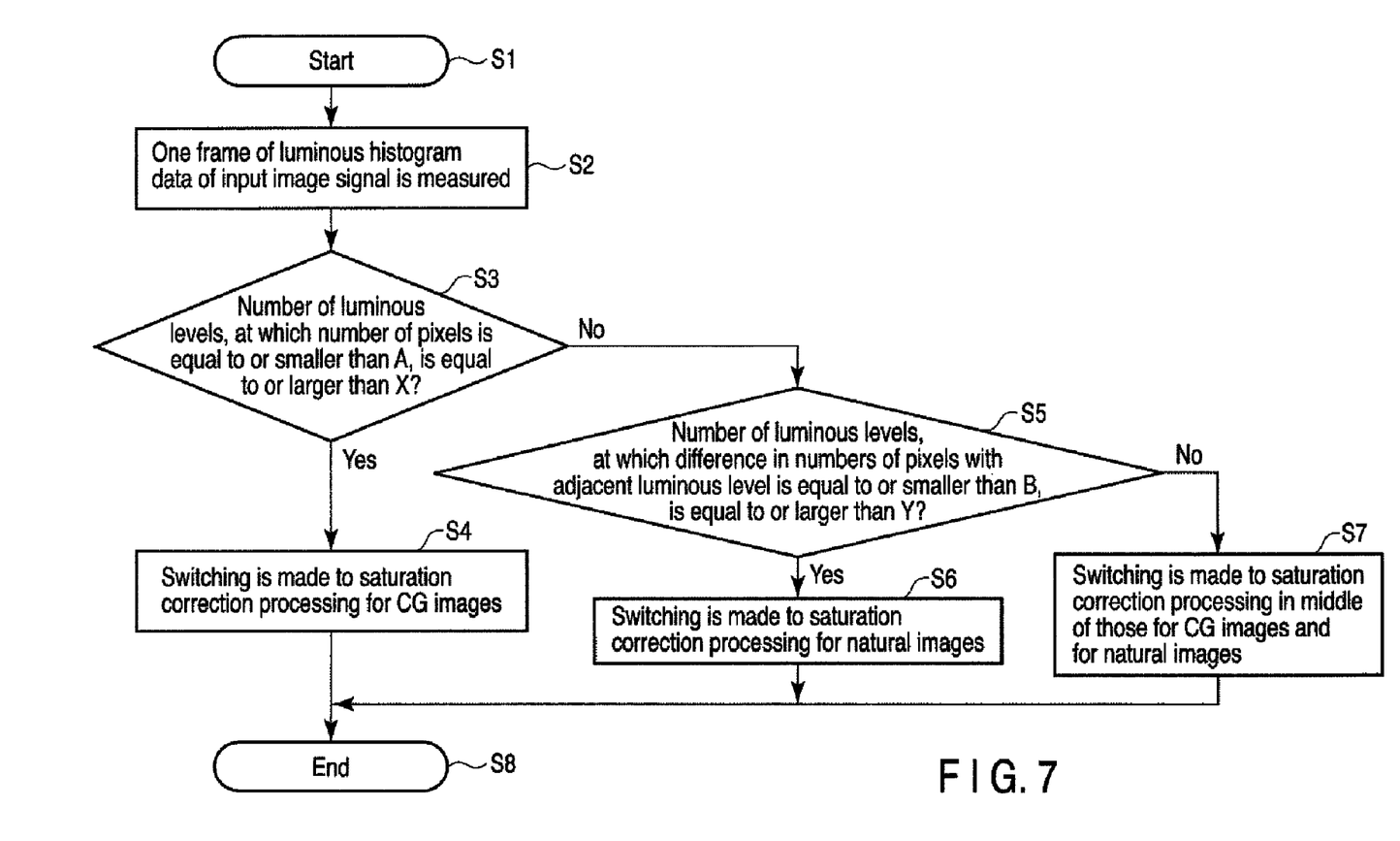
FIG. 7 is a flowchart shown for explaining an example of main processing operation carried out by the color projector in the embodiment.

FIG. 7 shows a flowchart that summarizes main processing operation of the color correction circuit 20 described above. That is, when processing starts (Step S1), for example, by an interrupt in time for every one second or so, the control module 24 controls the luminous distribution histogram measuring circuit 20a to measure luminous histogram data of one frame of an input luminous signal Y in Step S2.

After that, in Step S3, the control module 24 discriminates whether or not the number of luminous levels, at which the number of pixels is equal to or smaller than the first threshold value A, is equal to or larger than the second threshold value X based on the measured luminous histogram data. When the number of luminous levels is equal to or larger than the second threshold value X (YES), the saturation correction circuit 20b is switched to apply the saturation correction processing with the first correction amount that is increased for CG images in Step S4, and the processing ends (Step S8).

In addition, when the number of luminous levels, at which the number of pixels is equal to or smaller than the first threshold value A, is not equal to or larger than the second threshold value X in Step S3 (NO), the control module 24 discriminates whether or not the number of luminous levels, at which a difference in the numbers of pixels with an adjacent luminous level is equal to or smaller than the third threshold value B, is equal to or larger than the fourth threshold value Y based on the measured luminous histogram data in Step S5. When the number of luminous levels is equal to or larger than the fourth threshold value Y (YES), the saturation correction circuit 20b is switched to the second correction amount for applying the saturation correction processing just a little for natural images in Step S6, and the processing ends (Step S8).

On the other hand, when the control module 24 determines that the number of luminous levels, at which a difference in the numbers of pixels with an adjacent luminous level is equal to or smaller than the third threshold value B, is not equal to or larger than the fourth threshold value Y in Step S5 (NO), the control module 24 switches the saturation correction circuit 20b to apply the saturation correction processing with a third correction amount that is in the middle of those for CG images and natural images in Step S7, and the processing ends (Step S8).

According to the embodiment described above, whether an input image signal is of CG images or of natural images is automatically discriminated based on a characteristic of luminous histogram data, so as to switch a correction amount of color correction processing to an appropriate value. Accordingly, images that have appropriate color components can be projected and displayed with respect to both of CG images and natural images.

Also, when an image signal, in which CG images and natural images are mixed on the same screen, is input, a correction amount of color correction processing can be switched to an appropriate value in accordance with the proportions of a section showing the discrete type characteristic and a section showing the continuous type characteristic in luminous histogram data. Further, in the above embodiment, the description is made with respect to the color projector 11 in the DLP system. However, needless to say, the present invention is not limited thereto, and can be applied to color projectors of a variety of types, such as liquid crystal color projector.

Figure 8:
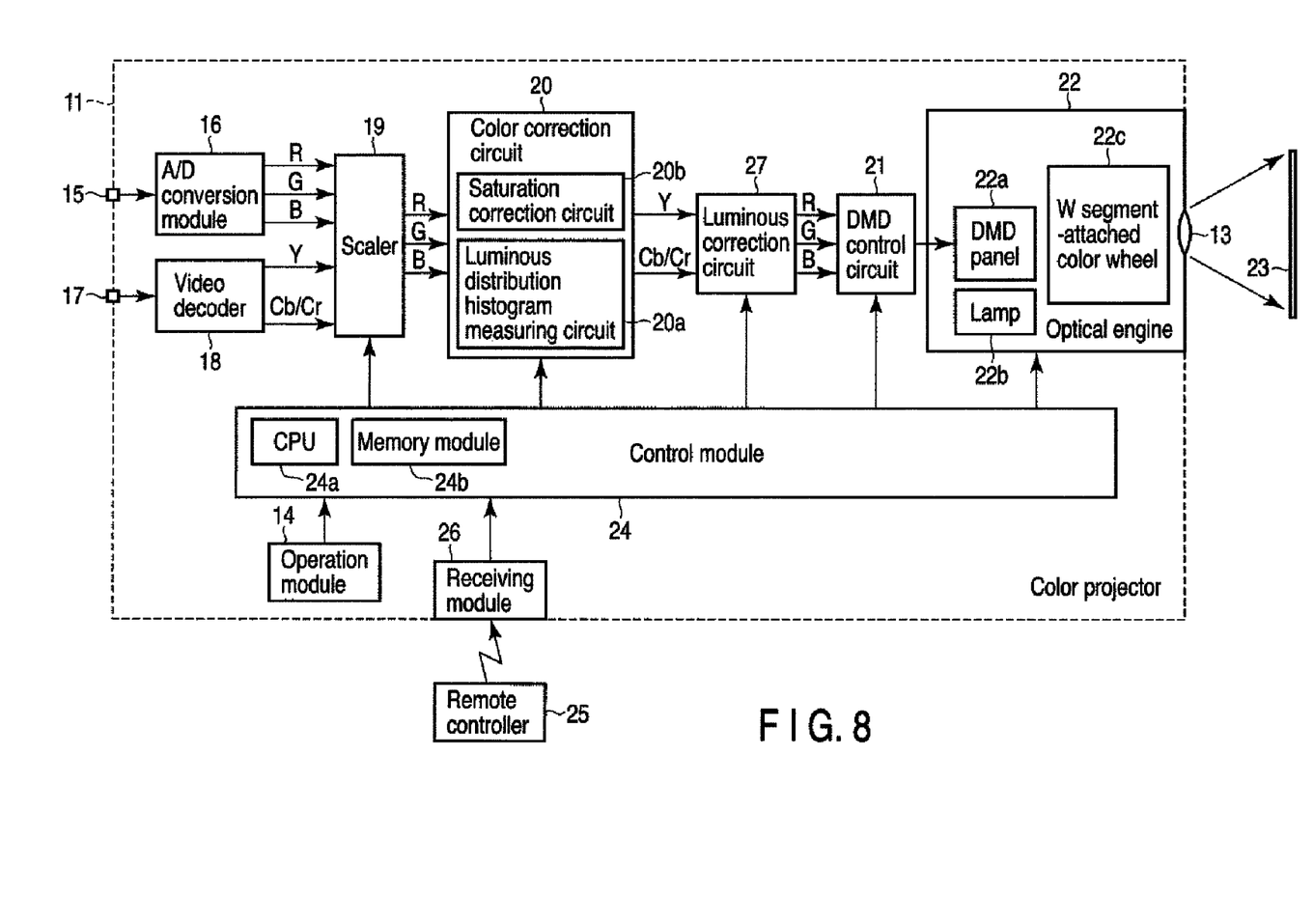
FIG. 8 is a block configuration diagram showing another embodiment of the present invention for explaining an outline of the signal processing system of the color projector.

Next, FIG. 8 shows another embodiment of the present invention. In FIG. 8, sections that are the same as those in FIG. 2 are attached with the same numerical references. The digital luminous signal Y converted from digital R, G, and B signals in the color correction circuit 20 and the color signals Cb/Cr applied with the saturation correction processing by the color correction circuit 20 are supplied to the luminous correction circuit 27.

The luminous correction circuit 27 applies luminous correction processing to the luminous signal Y supplied from the color correction circuit 20 based on a result of discrimination by the control module 24 as to whether an input image signal is of CG images or of natural images.

That is, when the input image signal is determined to be of CG images, the color correction circuit 20 applies the saturation correction processing with an increased correction amount so as to increase saturation of colors to the color signals Cb/Cr. For this reason, the luminous correction circuit 27 is controlled to apply luminous correction to the input luminous signal Y by restricting luminous somewhat, or rather, apply luminous correction just a little.

On the other hand, when the input image signal is determined to be of natural images, the color correction circuit 20 applies the saturation correction processing with a small correction amount, or rather operates to apply the saturation correction processing just a little, to the input color signals Cb/Cr, so as to prevent projected and displayed colors from becoming unnatural with too deep colors. In this case, original balance between luminous and saturation is lost. Accordingly, the luminous correction circuit 27 is controlled to apply the luminous correction processing to the input luminous signal Y to increase luminous. In this manner, original images with balanced luminous and colors are projected and displayed.

Then, the luminous signal Y applied with the luminous correction processing in the luminous correction circuit 27 and the color signals Cb/Cr applied with the saturation correction processing by the color correction circuit 20 are converted to digital R, G, and B signals and supplied to the DMD control circuit 21, and used for projection and display of the images.

Figure 9:
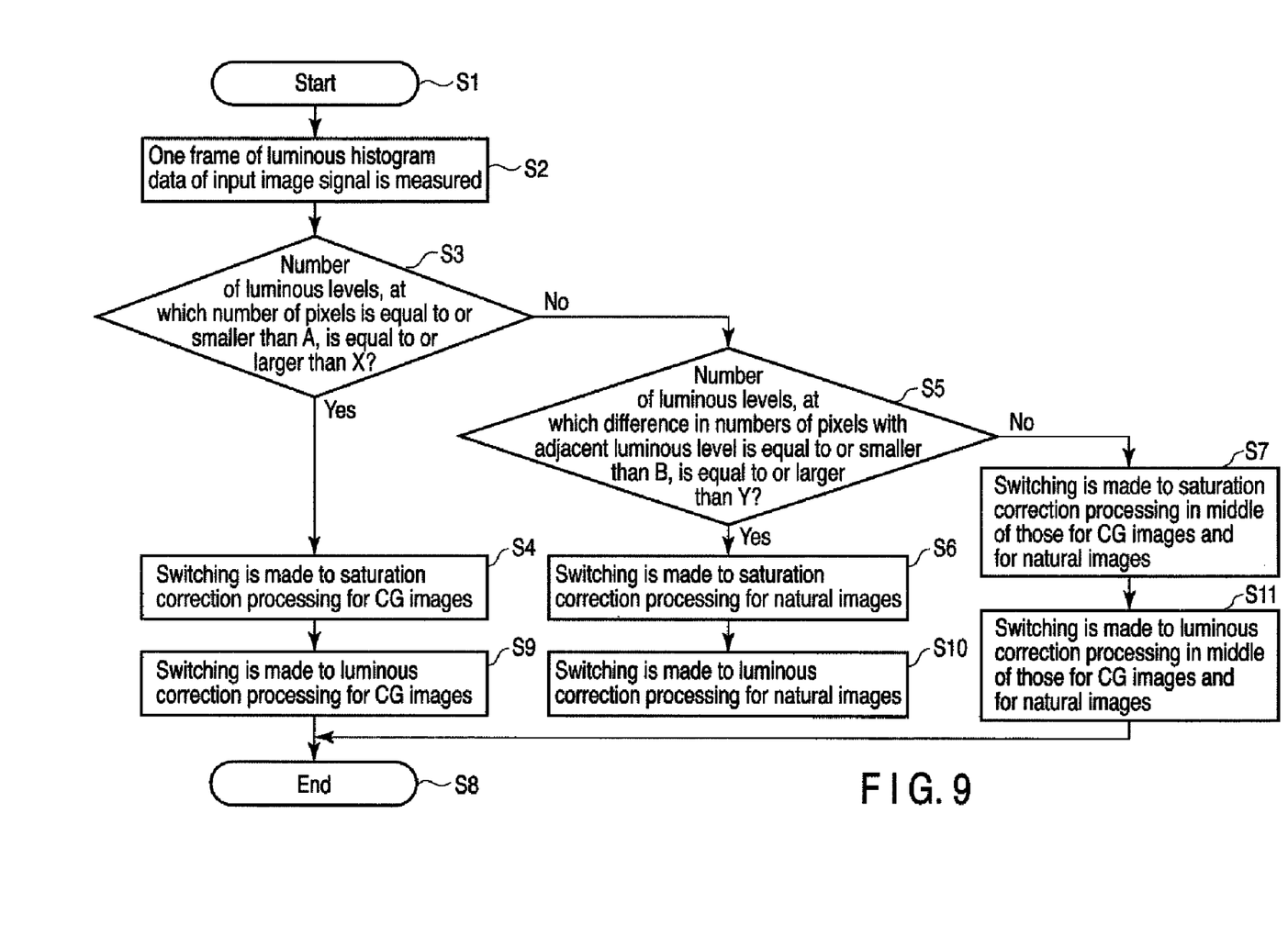
FIG. 9 is a flowchart shown for explaining an example of the main processing operation carried out by the color projector in another embodiment.

FIG. 9 shows a flowchart that summarizes main processing operation of the color projector 11 including the color correction circuit 27 described above. In FIG. 9, steps that are the same as those in FIG. 7 are attached with the same numerical references. After the control module 24 switches the saturation correction circuit 20b to apply the saturation correction processing with the first correction amount increased for CG images in Step S4, the control module 24 switches the luminous correction circuit 27 to be in a state of the luminous correction processing for CG images, in which luminous is somewhat restricted, or luminous correction is applied just a little in Step S9. Then, the processing ends (Step S8).

Also, after the control module 24 switches the saturation correction circuit 20b to the second correction amount for applying the saturation correction processing just a little for natural images in Step S6, the control module 24 switches the luminous correction circuit 27 to be in a state of the luminous correction processing for natural images so as to improve luminous in Step S10. Then, the processing ends (Step S8).

Further, after the control module 24 switches the saturation correction circuit 20b to apply the saturation correction processing with the third correction amount that is in the middle of those for CG images and natural images in Step S7, the control module 24 switches the luminous correction circuit 27 to be in a state of the luminous correction processing that is in the middle of those for CG images and for natural images in Step S11. Then, the processing ends (Step S8).

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A projection display device, comprising:
an input module that receives input of an image signal;
a discrimination module which discriminates whether the image signal input to the input module is of Computer Graphic images or of natural images;
a color correction module which applies color correction processing for Computer Graphic images to the image signal input to the input module when the discrimination module determines the image signal is of Computer Graphic images, or applies color correction processing for natural images to the image signal input to the input module when the discrimination modules determines the image signal is of natural images; and
a projection module which generates an optical image based on the image signal applied with the color correction processing by the color correction module, and projects and displays the image on a screen through a projection lens,
wherein the discrimination module determines that the image signal input to the input module is of Computer Graphic images when luminous histogram data of the image signal shows a discrete type characteristic, and that the image signal input to the input module is of natural images when the luminous histogram data of the image signal shows a continuous type characteristic,
wherein the discrimination module determines that the luminous histogram data has the discrete type characteristic when the number of luminous levels, at which the number of pixels is equal to or smaller than a first threshold value, is equal to or larger than a second threshold value with respect to the luminous histogram data of the image signal input to the input module, and that the luminous histogram data has the continuous type characteristic when the number of luminous levels, at which a difference in the numbers of pixels with an adjacent luminous level is equal to or smaller than a third threshold value, is equal to or larger than a fourth threshold value with respect to the luminous histogram data of the image signal input to the input module.

2. A projection display device of claim 1, wherein the color correction module applies the color correction processing with a predetermined first correction amount with respect to the image signal input to the input module when the discrimination module determines that the image signal is of Computer Graphic images, or the color correction processing with a second correction amount that is set to be smaller than the first correction amount with respect to the image signal input to the input module when the discrimination module determines that the image signal is of natural images.

3. A projection display device of claim 2, wherein the color correction module applies the color correction processing with a third correction amount that is in the middle of the first correction amount and the second correction amount with respect to the image signal input to the input module when the discrimination module determines that the image signal is of neither Computer Graphic images nor natural images.

4. A projection display device of claim 1, wherein the projection module carries out projection of images in a Digital Light Processing (DLP) system including a color wheel that has a white segment.

5. A projection display device, comprising:
an input module which receives input of an image signal;
a discrimination module which discriminates whether the image signal input to the input module is of Computer Graphic images or of natural images;
a color correction module which applies color correction processing for Computer Graphic images to the image signal input to the input module when the discrimination module determines the image signal is of Computer Graphic images, or applies color correction processing for natural images to the image signal input to the input module when the discrimination modules determines the image signal is of natural images;
a luminous correction module which applies luminous correction processing for Computer Graphic images to the image signal input to the input module when the discrimination module determines that the image signal is of Computer Graphic images, or applies luminous correction processing for natural images to the image signal input to the input module when the discrimination module determines that the image signal is of natural images; and
a projection module which generates an optical image based on the image signal applied with the color correction processing and the luminous correction processing by the color correction module and the luminous correction module, and projects and displays the image on a screen through a projection lens,
wherein the discrimination module determines that the image signal input to the input module is of Computer Graphic images when luminous histogram data of the image signal shows a discrete type characteristic, and that the image signal input to the input module is of natural images when the luminous histogram data of the image signal shows a continuous type characteristic,
wherein the luminous correction module applies predetermined luminous correction processing to the image signal input to the input module when the discrimination module determines that the image signal is of Computer Graphic images, or applies the bright correction processing that increases luminous higher than as increased by the predetermined luminous correction processing to the image signal input to the input module when the discrimination module determines that the image signal is of natural images.

* * * * *